(12) United States Patent
Hodgetts (10) Patent No.: US 10,167,624 B1
(45) Date of Patent: Jan. 1, 2019

(54) MOBILE SHELTER AND METHOD OF ERECTING THE SAME

(71) Applicant: Craig Hodgetts, Los Angeles, CA (US)

(72) Inventor: Craig Hodgetts, Los Angeles, CA (US)

( * ) Notice: Subject to any disclaimer, the term of this patent is extended or adjusted under 35 U.S.C. 154(b) by 0 days.

(21) Appl. No.: 15/693,269

(22) Filed: Aug. 31, 2017

(51) Int. Cl.
*E04B 1/32* (2006.01)
*E04B 1/344* (2006.01)
*E04B 1/343* (2006.01)

(52) U.S. Cl.
CPC ........ *E04B 1/3442* (2013.01); *E04B 1/34336* (2013.01); *E04B 1/34384* (2013.01)

(58) Field of Classification Search
CPC . E04B 1/3442; E04B 1/34336; E04B 1/34384
USPC ......... 52/63, 79.1, 79.4, 79.5, 79.9, 86, 143; 135/88.13, 88.17, 88.18, 124, 906, 913
See application file for complete search history.

(56) References Cited

U.S. PATENT DOCUMENTS

| | | | | |
|---|---|---|---|---|
| 674,920 A * | 5/1901 | Jones | ................... | A47C 29/006 135/137 |
| 1,608,242 A * | 11/1926 | Sava | ....................... | E04H 15/40 135/126 |
| 2,357,056 A * | 8/1944 | Nelson | ................. | A47C 29/006 135/125 |
| 2,493,833 A * | 1/1950 | Reynolds | ................ | B63B 17/02 114/361 |
| 2,666,507 A * | 1/1954 | Ruark | ................... | E04B 1/3205 52/639 |
| 2,693,195 A * | 11/1954 | Frieder | ............... | E04B 1/34326 135/122 |
| 2,765,499 A * | 10/1956 | Couse | ................... | E04B 1/3442 296/176 |
| 2,827,138 A * | 3/1958 | Roy, Jr. | ..................... | A01G 9/16 52/86 |
| 3,064,667 A * | 11/1962 | Marino | .................... | B60J 7/062 135/120.3 |
| 3,217,722 A * | 11/1965 | Heise | .................. | E04B 1/34326 135/139 |
| 3,363,938 A * | 1/1968 | Schultz | .................... | B60J 7/062 296/100.12 |
| 3,424,178 A * | 1/1969 | Yazaki | ..................... | A01G 9/16 135/157 |
| 3,653,165 A * | 4/1972 | West | ..................... | E04B 1/3442 52/121 |
| 3,798,851 A * | 3/1974 | Utahara | ............... | E04B 1/3205 135/124 |

(Continued)

*Primary Examiner* — Charles A Fox
*Assistant Examiner* — James J Buckle, Jr.
(74) *Attorney, Agent, or Firm* — Daniel L. Dawes; Marcus C. Dawes (57) ABSTRACT

A mobile shelter or facility adapted to be mounted on a flatbed of a highway tractor. The mobile shelter includes a compacted configuration that quickly and easily transforms into an expanded configuration. The compacted configuration conforms to transportation codes, and once at a desired location, the expanded configuration operates as a self-sufficient facility. The transformation is employed by either a hand-powered, electric or hydraulically powered winch or gear system. The expanded configuration further includes a pinnacle roof structure that is supported by load bearing sidewalls extended vertically from the flatbed. The sidewalls comprise box-like structures that provide storage alcoves for the mobile shelter when in the compacted configuration.

26 Claims, 6 Drawing Sheets

(56) References Cited

U.S. PATENT DOCUMENTS

| | | | | |
|---|---|---|---|---|
| 3,837,702 | A * | 9/1974 | Case | B60J 7/102 |
| | | | | 296/104 |
| 4,012,867 | A * | 3/1977 | Lainchbury | A01G 9/18 |
| | | | | 47/17 |
| 4,055,030 | A * | 10/1977 | Earnshaw | A01G 9/14 |
| | | | | 52/86 |
| 4,070,846 | A * | 1/1978 | Sohlberg | E04B 1/3441 |
| | | | | 52/641 |
| 4,715,159 | A * | 12/1987 | Hijazi | E04H 3/00 |
| | | | | 52/109 |
| 4,829,726 | A * | 5/1989 | de Potter d'Indoye | E04B 1/3444 |
| | | | | 52/64 |
| 4,844,109 | A * | 7/1989 | Navarro | E04H 6/04 |
| | | | | 135/129 |
| 4,885,879 | A * | 12/1989 | Plantier | E01F 7/02 |
| | | | | 52/299 |
| 5,005,896 | A * | 4/1991 | Li | B60J 7/062 |
| | | | | 135/129 |
| 5,333,421 | A * | 8/1994 | McKenna | E04B 1/3205 |
| | | | | 52/63 |
| 5,335,684 | A * | 8/1994 | Hanninen | E04H 15/18 |
| | | | | 135/115 |
| 5,338,084 | A * | 8/1994 | Wardell | B60J 7/062 |
| | | | | 296/100.12 |
| 5,524,953 | A * | 6/1996 | Shaer | B60J 7/062 |
| | | | | 296/100.12 |
| 5,595,203 | A * | 1/1997 | Espinosa | E04H 15/36 |
| | | | | 135/123 |
| 5,598,668 | A * | 2/1997 | Isom | A01G 9/16 |
| | | | | 52/86 |
| 5,867,948 | A * | 2/1999 | Liu | E04B 1/3205 |
| | | | | 52/656.9 |
| 6,026,613 | A * | 2/2000 | Quiring | E04B 7/08 |
| | | | | 52/63 |
| 6,070,925 | A * | 6/2000 | Moldofsky | E04H 15/06 |
| | | | | 135/88.13 |
| 6,073,404 | A * | 6/2000 | Norfleet | A63H 33/044 |
| | | | | 446/109 |
| 6,640,505 | B1 * | 11/2003 | Heierli | E02D 29/045 |
| | | | | 52/169.14 |
| 6,679,009 | B2 * | 1/2004 | Hotes | E04H 15/36 |
| | | | | 135/117 |
| 6,712,414 | B2 * | 3/2004 | Morrow | B60P 3/34 |
| | | | | 296/165 |
| 6,758,014 | B2 * | 7/2004 | Chen | A01G 9/14 |
| | | | | 52/63 |
| 6,763,633 | B2 * | 7/2004 | Cote | E04B 1/344 |
| | | | | 135/128 |
| 6,772,563 | B2 * | 8/2004 | Kuhn | E04B 1/34305 |
| | | | | 220/1.5 |
| 7,007,706 | B2 * | 3/2006 | Pinnell | A63C 19/12 |
| | | | | 135/123 |
| 7,021,694 | B1 * | 4/2006 | Roberts | B60J 7/102 |
| | | | | 135/88.13 |
| 7,100,625 | B2 * | 9/2006 | Valles | E04H 15/08 |
| | | | | 135/119 |
| 7,290,378 | B2 * | 11/2007 | Kalnay | E04B 1/34305 |
| | | | | 135/126 |
| 7,396,064 | B2 * | 7/2008 | Hicks | B60P 3/341 |
| | | | | 296/26.01 |
| 7,418,802 | B2 * | 9/2008 | Sarine | E04B 1/34305 |
| | | | | 52/79.1 |
| 7,520,290 | B2 * | 4/2009 | Dalbo | E04H 15/06 |
| | | | | 135/145 |
| 7,644,543 | B2 * | 1/2010 | Amidon, II | E04H 3/08 |
| | | | | 52/106 |
| 7,681,941 | B2 * | 3/2010 | Freeman | B60P 3/341 |
| | | | | 135/152 |
| 7,798,547 | B2 * | 9/2010 | Antaya | B05B 16/80 |
| | | | | 296/26.13 |
| 7,823,337 | B2 * | 11/2010 | Pope | E04B 1/3431 |
| | | | | 52/64 |
| 7,874,107 | B1 * | 1/2011 | Medley | E04B 1/3444 |
| | | | | 220/1.5 |
| 7,882,659 | B2 * | 2/2011 | Gyory | E04B 1/3444 |
| | | | | 296/182.1 |
| 7,930,857 | B2 * | 4/2011 | Pope | E04B 1/3431 |
| | | | | 52/64 |
| 7,967,369 | B2 * | 6/2011 | Davidson | B60P 3/341 |
| | | | | 296/173 |
| 7,980,029 | B2 * | 7/2011 | Ahmedy | E04H 15/52 |
| | | | | 135/121 |
| 8,001,987 | B2 * | 8/2011 | Williams | E04H 15/06 |
| | | | | 135/125 |
| 8,141,304 | B2 * | 3/2012 | Shen | E04B 1/3444 |
| | | | | 296/172 |
| 8,166,715 | B2 * | 5/2012 | De Azambuja | B60P 3/34 |
| | | | | 52/122.1 |
| 8,291,648 | B1 * | 10/2012 | Orr | E04B 1/34305 |
| | | | | 135/124 |
| 8,308,213 | B1 * | 11/2012 | Sharkey | B60P 3/34 |
| | | | | 296/26.12 |
| 8,347,560 | B2 * | 1/2013 | Gyory | E04B 1/3444 |
| | | | | 52/64 |
| 8,622,066 | B2 * | 1/2014 | Dolsby | E04B 1/3444 |
| | | | | 135/143 |
| 8,650,806 | B1 * | 2/2014 | Condie | E04H 1/1205 |
| | | | | 52/79.5 |
| 8,695,284 | B2 * | 4/2014 | Ho | E04H 1/125 |
| | | | | 52/64 |
| 8,695,285 | B2 * | 4/2014 | Reinmann, Jr. | E04H 9/16 |
| | | | | 299/12 |
| 8,739,474 | B2 * | 6/2014 | Chang | E04B 1/34378 |
| | | | | 52/79.5 |
| 8,752,339 | B1 * | 6/2014 | Tubbs | E06B 7/28 |
| | | | | 52/64 |
| 8,813,455 | B2 * | 8/2014 | Merrifield | E04C 3/005 |
| | | | | 135/144 |
| 8,919,049 | B2 * | 12/2014 | Meserini | E03C 1/01 |
| | | | | 52/143 |
| 9,085,890 | B2 * | 7/2015 | Strickland | E04B 1/34384 |
| 9,382,703 | B2 * | 7/2016 | Quinn | E04B 1/24 |
| 9,551,143 | B2 * | 1/2017 | Saez Blaya | E04H 1/005 |
| 2003/0005953 | A1 * | 1/2003 | Erbetta | E04H 15/36 |
| | | | | 135/151 |
| 2003/0115808 | A1 * | 6/2003 | Morrow | B60P 3/34 |
| | | | | 52/64 |
| 2005/0120639 | A1 * | 6/2005 | Bucher | E04B 1/3431 |
| | | | | 52/64 |
| 2005/0138867 | A1 * | 6/2005 | Zhao | E04H 1/04 |
| | | | | 52/79.1 |
| 2005/0144858 | A1 * | 7/2005 | Bothun | A47B 53/02 |
| | | | | 52/79.1 |
| 2006/0225369 | A1 * | 10/2006 | Napier | E04B 1/3442 |
| | | | | 52/69 |
| 2006/0254159 | A1 * | 11/2006 | Trautman | B60P 3/34 |
| | | | | 52/64 |
| 2007/0113488 | A1 * | 5/2007 | Wilson | E04B 1/344 |
| | | | | 52/79.5 |
| 2009/0090406 | A1 * | 4/2009 | Maxinnilien | E04H 15/06 |
| | | | | 135/88.13 |
| 2010/0170162 | A1 * | 7/2010 | Pfeiffer | E04H 15/008 |
| | | | | 52/2.24 |
| 2010/0192481 | A1 * | 8/2010 | Shen | E04B 1/3444 |
| | | | | 52/79.5 |
| 2010/0319742 | A1 * | 12/2010 | Prusmack | B60P 3/34 |
| | | | | 135/88.13 |
| 2011/0120026 | A1 * | 5/2011 | Hache | B60P 3/14 |
| | | | | 52/79.5 |
| 2011/0214362 | A1 * | 9/2011 | Huang | E04H 1/02 |
| | | | | 52/79.5 |
| 2012/0279142 | A1 * | 11/2012 | Michaud | E04B 1/3442 |
| | | | | 52/79.5 |

* cited by examiner

MOBILE SHELTER AND METHOD OF ERECTING THE SAME

BACKGROUND OF THE INVENTION

1. Field of the Invention

The invention relates to the field of mobile shelters. More particularly, the invention relates to a mobile shelter assembly adapted to be mounted on a tractor-trailer bed and transported on roadways.

2. Description of the Prior Art

There are many portable structures that have been developed for a wide range of differing applications. It is generally the case with all such structures to have numerous goals that must be met, for example, providing rapid assembly of the structure for the intended use, being of sufficient size for the intended use and being transportable. For some applications, there is little else that matters, but for other applications there are additional needs that must be met.

For instance, it would be appreciated if a portable structure that has the size capacity to shelter and provide services for up to a predetermined individuals at the same time, could also be ready-to-use and mainly self-sufficient. It is also typically the case, that when emergency services are needed, field offices are requested or class rooms are required, that certain facilities and accessories would be needed, for example lavatories, nursing stations, sleeping berths, etc. Additionally, the occupants would require adequate space heating, space cooling, lighting, a power supply, and a water supply. There is also the desire to carry and store accessories for use during operation. Due to the circumstances that surround emergency situations, field operations or the corporate need for extra space, the ability to have an effective and efficient manner of transporting the portable structure from one location to another, while meeting all transportation and highway safety requirements in the process, is a necessity.

BRIEF SUMMARY OF THE INVENTION

In one aspect, a mobile shelter or facility is provided. The mobile shelter is adapted to be mounted or carried on a flatbed of a highway tractor. The mobile shelter has two configurations, namely a first compacted configuration that quickly and relatively effortlessly transforms into a second expanded, usable or habitable configuration. Transformation of the mobile shelter between these two configurations can be repeatedly made with substantially equal ease and speed. The compacted configuration conforms to all state highway transportation codes, and once at a desired location, the expanded, usable or habitable configuration is assumed to provide a self-sufficient or substantially ready-to-use structure.

In a preferred embodiment, the transformation between configurations is effected by either a hand-powered, electric or hydraulically powered winch or gear system. The expanded, usable or habitable configuration further includes a pinnacle roof structure that is supported by load bearing sidewalls extended vertically from the flatbed. Four sidewalls are combined with two end walls to comprise the vertical walls of the structure. In the illustrated embodiment the sidewalls each comprise a box-like structure having an inner facing side and an outer facing side. In a preferred embodiment, there are two proximal sidewalls and two distal sidewalls as referenced to the front of the flatbed. The two proximal sidewalls are coupled to a front end wall and two distal sidewalls are coupled to a rear end wall. For transformation to be effected, one exterior edge of each proximal sidewall is pivotably attached to the front end wall, which in the illustrated embodiment is movable on the flatbed and is the driving wall. Similarly, one exterior edge of each distal sidewall is pivotably attached to the rear end wall, which in the illustrated embodiment is fixed to the flatbed. An interior edge of each proximal sidewall is pivotably attached to the adjacent distal sidewall. When in the expanded configuration the proximal and distal sidewalls swing out to form a diamond-like structure in plan view and extend beyond the lateral edges of the flatbed.

In the expanded configuration, the sidewalls are in an extended configuration. The expanded configuration is defined when the sidewalls are extended away from a center longitudinal axis of the flatbed.

In a preferred embodiment, the sidewalls further define vertical supports that include alcoves within them for storage or compartmentalization of the interior space defined by the structure. The self-sufficiency of the mobile shelter is provided by supplying a variety of amenities or service functions within the alcoves. The amenities can include, but are not limited to toilets and lavatories, nursing stations, dispensary, air handling, sleeping berths, exhibit cases, instrumentation packages, work stations, service counters, storage containers, intensive care units, and multi-media presentation equipment. An on-board generator can also be provided to provide portable electrical power for a variety of uses. A water supply and a waterless waste storage also makes the shelter self-sufficient and its inhabitants sustainable for an extended period of time.

In a preferred embodiment, the mobile shelter further comprises a base or flooring structure that is vertically supported within the sidewall alcoves when the shelter is in the compacted configuration. The base structure comprises hinged flooring panels that fold out and are adapted to be laid horizontally for providing a continuous flooring surface. The sidewalls, the base structure and the roof structure together comprise an interior volume for holding up to a predetermined number of occupants in a defined space, depending on the nature of the intended usage, when the shelter is in the expanded configuration. In a preferred embodiment, the defined interior space of the shelter is approximately eight (8) to ten (10) square meters, which is considered an optimum size for classrooms, operation rooms and the like.

In a preferred embodiment, the roof structure includes sealed containers that are concealed within the roof structure. The containers are designed to open in order to allow waterproof canvases or flexible plastic roofing sections to extend from the roof to the sidewalls below. The canvas or plastic roofing sections enclose the structure when in the expanded configuration, protecting the interior volume from the outside elements.

Therefore, the invention can be characterized as a mobile shelter comprising a transportable container having a first end and a second end, defining a longitudinal center axis there through, wherein the container further comprises a base structure, a roof structure adjustably folded over the base structure; and a load bearing frame comprised of four sidewalls, the sidewalls having an interior side and an exterior side, the sidewalls extending upwardly from the base structure. The shelter is transformed between a compacted configuration and an expanded configuration when the load bearing frame is rotated outward from the base structure.

The mobile shelter further comprises a drive wall. The compacted configuration transforms into the expanded configuration when the drive wail moves along the longitudinal axis, the drive wall forcing the sidewalls into an expanded configuration. The compacted configuration is defined when the drive wall is at the furthermost point of the first end and the sidewalls are aligned with the longitudinal axis. The expanded configuration is defined when the drive wall moves along the longitudinal axis towards the second end of the container, so as to force the sidewalls to fold outward from the axis.

A substantially closed interior volume is defined when the sidewalls are in the expanded configuration. Each sidewall further comprises alcoves on the inner side thereof. The base structure comprises hinged flooring panels that are vertically supported within the container when the shelter is in the compacted configuration. The flooring panels are adapted to fold down and lay horizontally when the shelter is in the expanded configuration. The load bearing frame supports the roof structure when the shelter is in the expanded configuration.

The mobile shelter further comprises retractable or telescopic supports or pylons for supporting the frame when the structure is in the expanded configuration.

The roof structure comprises a pinnacle roof raised above the base structure, defining an apex line. The roof structure further comprises sections of sheet material that extend from the roof structure to the sidewalls, wherein the sections of sheet material complete the full enclosure of the shelter from outside elements. The sections of sheet material are waterproof.

The sidewalls further comprise at least one interior corner, and one sidewall is hinged to another adjacent sidewall at an interior corner thereof. The mobile shelter further comprises a hinge adapted to provide expandable folding movement of the sidewalls relative to each other.

The invention can thus be summarized as a mobile shelter for mounting onto a flatbed of a trailer comprising a container having a longitudinal axis defined there through, the container further comprising a flooring structure, a roof structure adjustably fitted over the flooring structure, and a load bearing frame comprised of four sidewalls, the sidewalls having an interior side and an exterior side. The container is configurable between a compacted configuration and an expanded configuration. A drive wall is coupled to the load bearing frame for configuring the shelter between the compacted configuration and the expanded configuration.

The invention is also directed to a method of configuring a mobile shelter between a compacted configuration and an expanded configuration comprising the steps of moving a first end of a transportable container along a base structure; simultaneously raising a roof structure over the base structure; and simultaneously swinging four load bearing sidewalls out from the base structure to configure the roof structure and sidewalls into the expanded configuration whereby the shelter is formed.

The step of moving the first end forces the sidewalls and roof structure into an expanded configuration. This motion is reversed in direction to reconfigure the shelter from the expanded configuration to the compacted configuration by moving the first end in the reverse direction, simultaneously lowering the roof structure, and simultaneously swinging in the four load bearing sidewalls.

The method further comprises the step of extending the roof structure to provide a covered shelter. The step of extending the roof structure comprises completing the roof structure to cover the shelter by means of extending flexible sheeting attached to and stored in the roof structure.

The method further comprises the step of rotating down flooring panels which are vertically stored within the container when the shelter is in the compacted configuration. The flooring panels are adapted to fold down and lay horizontally when the shelter is in the expanded configuration.

The step of moving the first end, simultaneously raising a roof structure, and simultaneously swinging four load bearing sidewalls comprises the step of coupling the first end, roof structure and sidewalls together in a three dimensional polyhedron with selectively rotatably linked edges.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below

DETAILED DESCRIPTION OF THE PREFERRED EMBODIMENTS

Figure 1:
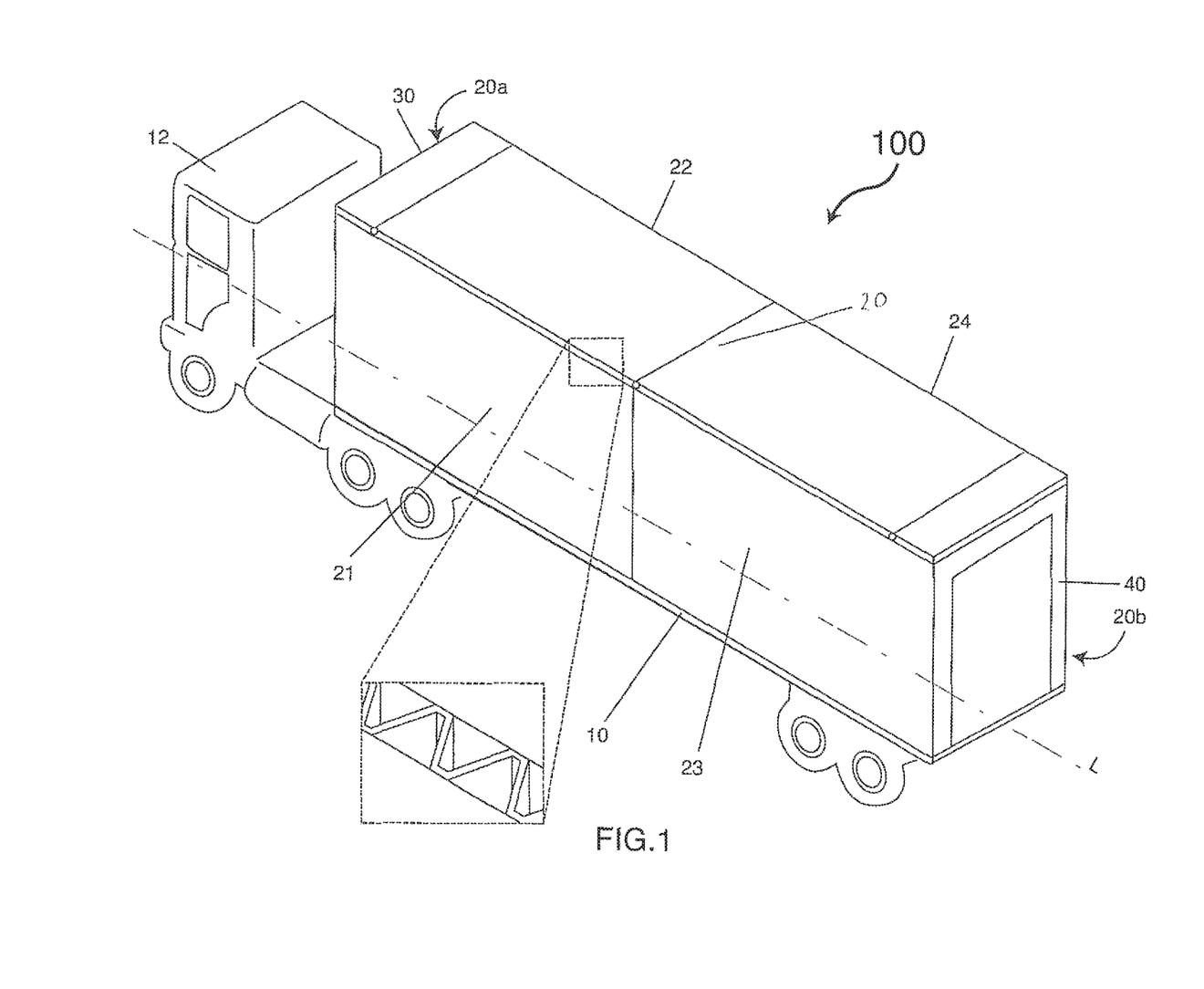
FIG. 1 is an isometric view of a preferred embodiment of a mobile shelter according to the present invention.

FIG. 1 illustrates a preferred embodiment of a mobile shelter or facility, referred to generally as 100, in accordance with the present invention. The mobile shelter 100 is adapted to be mounted on a frame or flatbed 10 of a vehicle, although any portable platform can be equivalently substituted, such as portable containers that can be transferred among means for air, rail, ship and truck transport. In a preferred embodiment, the vehicle is a highway tractor 12. The mobile shelter 100, generally comprises a container 20 and defines a longitudinal axis L that extends through the length of the container 20. The container 20 has a proximal or front. end 20a near cab 12 and a distal or rear end 20b distant from cab 12 of the truck and is structurally composed of two proximal sidewalls 21, 22, and two distal sidewalls 23, and 24. The sidewalls 21, 22, 23, 24 are load bearing walls and may incorporate internal reinforcements for this purpose, such as internal structural corrugation as shown in the inset in FIG. 1.

Figure 2:
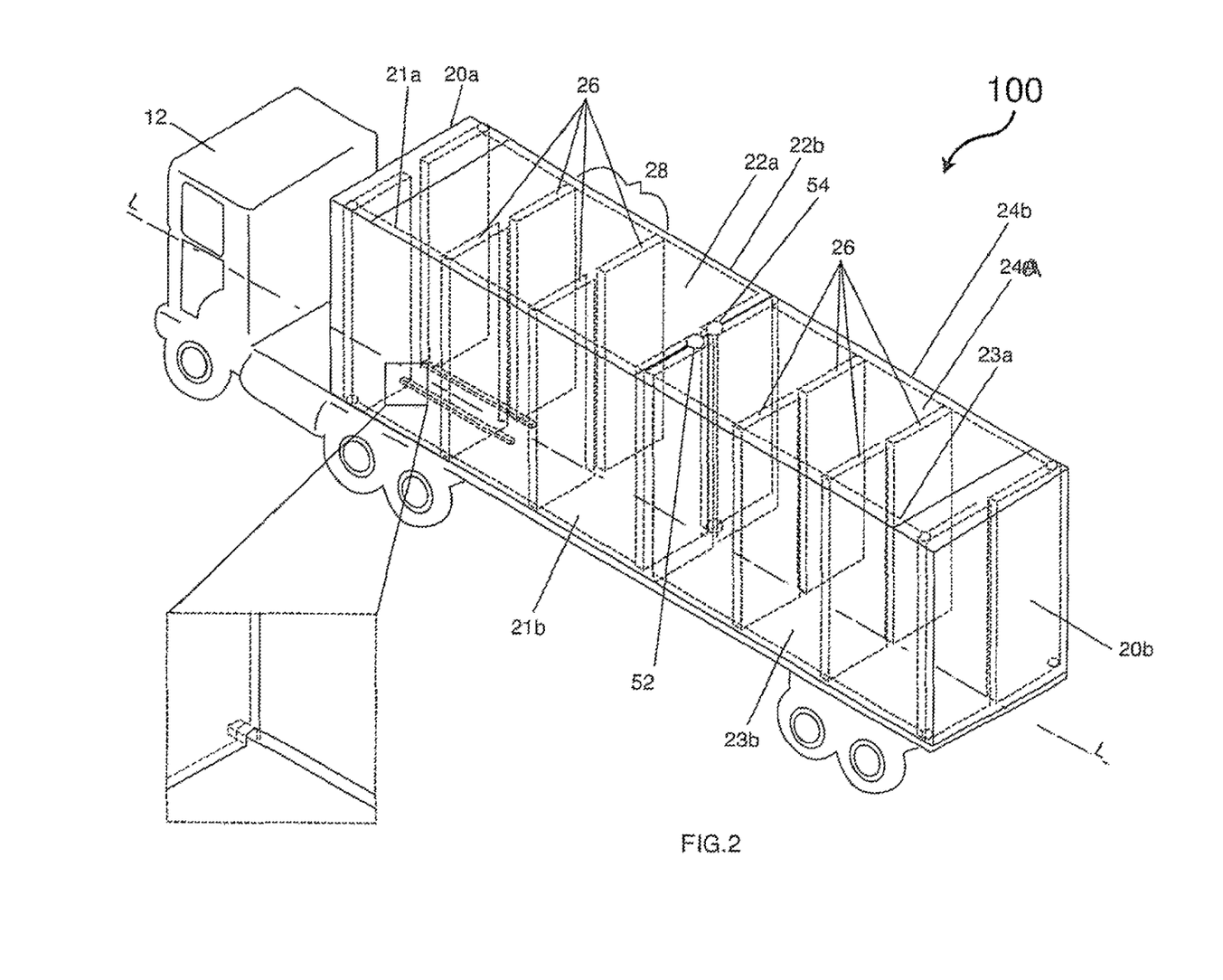
FIG. 2 is a see-through view of a preferred embodiment of a mobile shelter of FIG. 1 according to the present invention.

Best shown in the phantom view of FIG. 2, each sidewall 21, 22, 23, 24 has an inner facing side 21a, 22a, 23a, 24a and an outer facing side 21b, 22b, 23b, 24b. Each sidewall 21, 22, 23, 24 has supports or interior walls 26 extending from the inner facing side 21a, 22a, 23a, 24a, which provide for further structural support and internal compartmentalization of a portion of the interior space which will be defined by shelter 100.

Figure 3A:
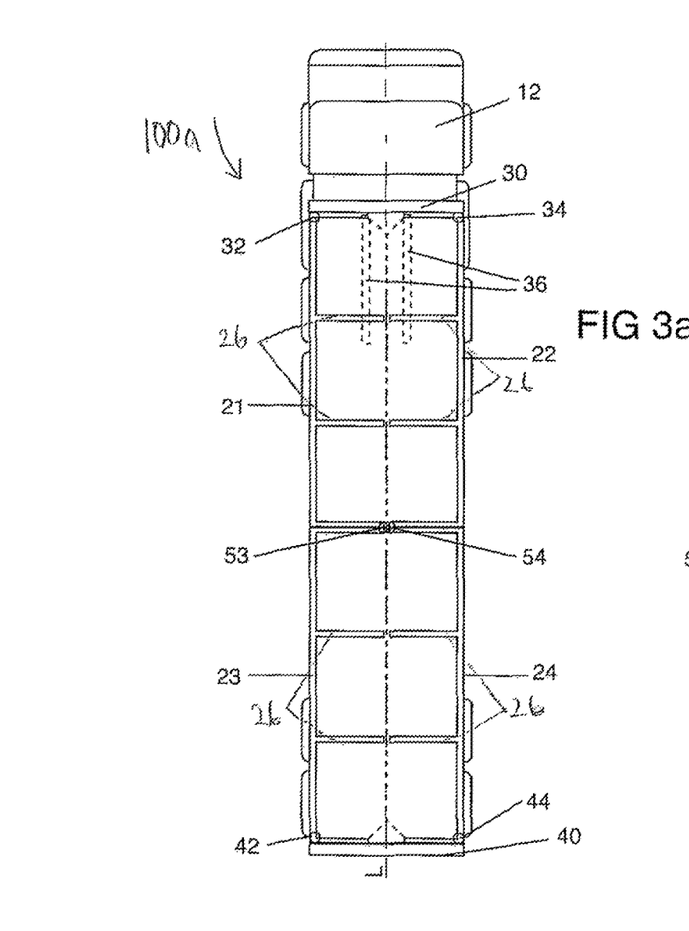
FIG. 3a is a top plan view of a preferred embodiment of a mobile shelter of FIGS. 1 and 2 in the compacted configuration according to the present invention.
Figure 3B:
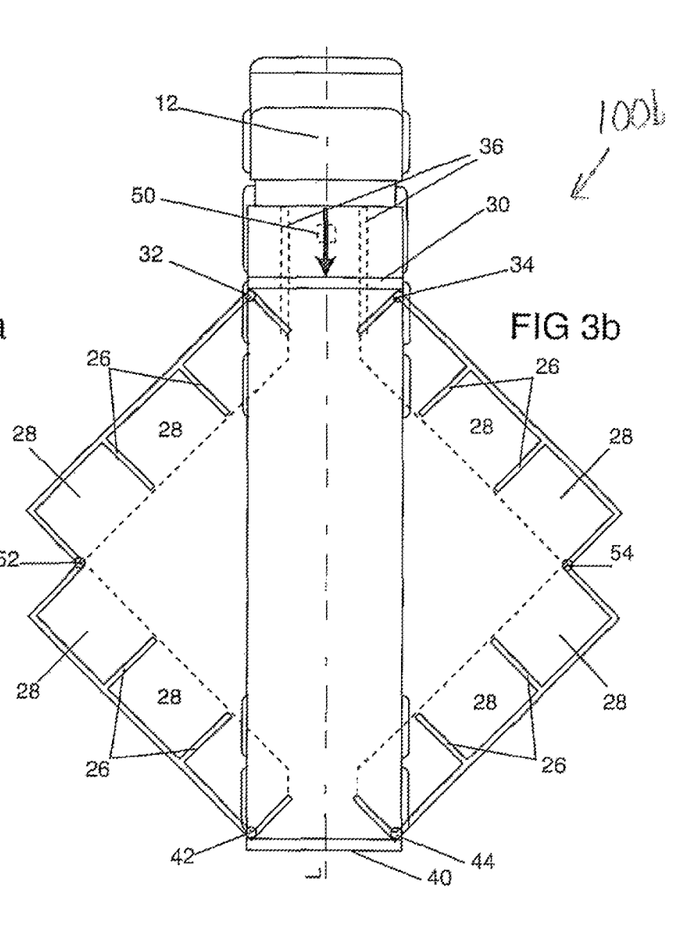
FIG. 3b is a top plan view of a preferred embodiment of a mobile shelter of FIGS. 1-3a in the expanded configuration according to the present invention.

Best shown in FIGS. 3a and 3b, the supports 26 meet at or near the longitudinal axis L when the shelter 100 is in the compacted configuration 100a. The supports 26 provide structural support for the sidewalls 21, 22, 23, 24 and provide accessory stations for accessories that need to be transported with the shelter. It is to be understood that the number and arrangement of supports 26 is variable and can be chosen to meet specific design requirements in any application. While in the compacted configuration 100a, the outside envelope of shelter 100 conforms to all state highway transportation codes or other size restrictions arisen from transportation regulations or modular container handling.

FIGS. 3a and 3b further show the transformation process of the shelter 100 from its compacted configuration 100a to its expanded configuration 100b An outer corner 32, 34 of each proximal sidewall 21 and 22 respectively is hinged to or pivoted with a movable front drive wail 30. An outer corner 42, 44 of each distal sidewall 23, 24 respectively is hinged to a distal fixed rear wall 40. However, it must be understood that front wall 30 may made fixed and rear wall 40 then used as a movable drive wall if desired. An inner corner 52, 54 of the each proximal sidewall 21, 22 is pivotably coupled to an inner corner of each distal sidewall 23, 24 respectively. The hinged connections form two vertical hinges or pivots 52, 54.

Figure 4:
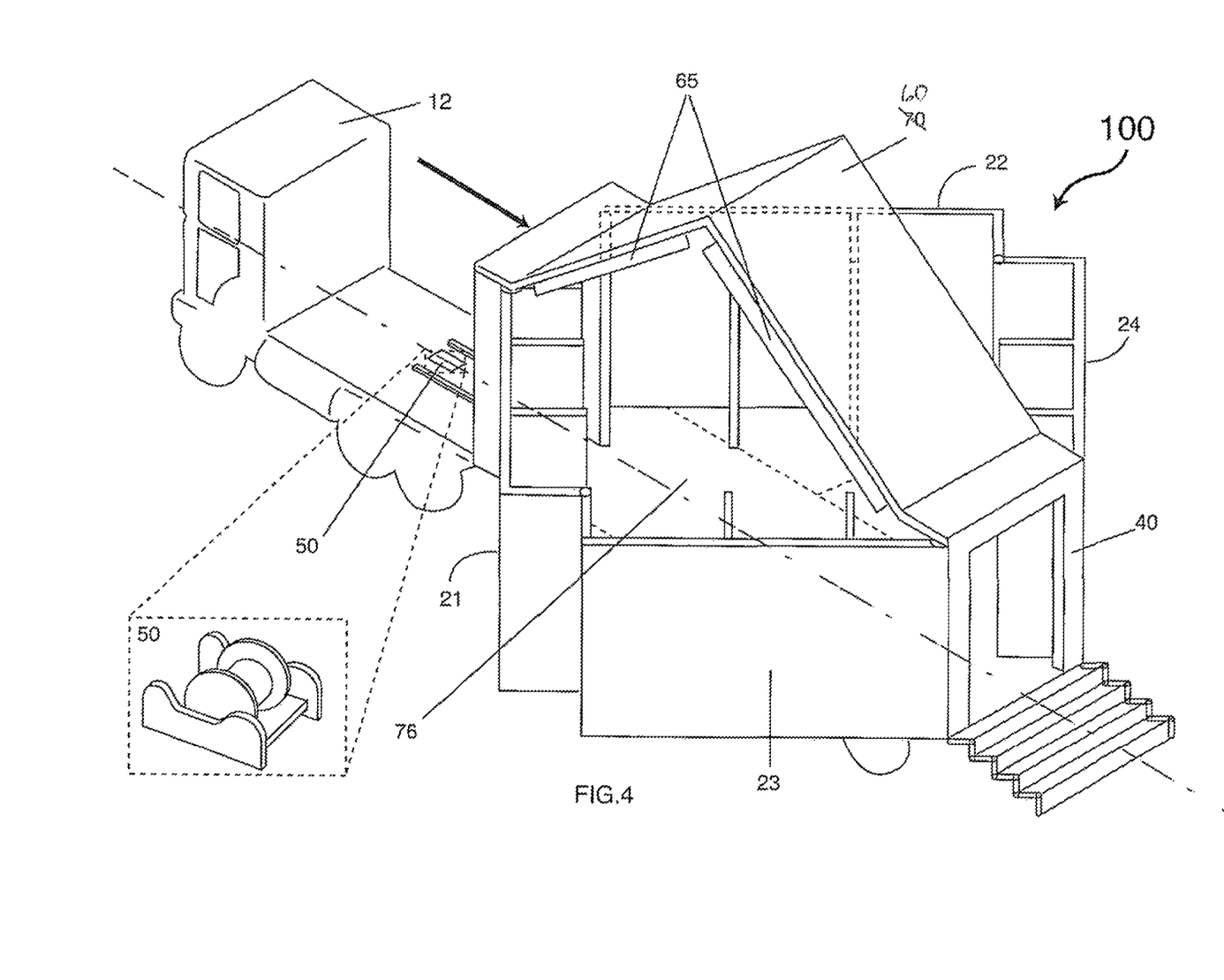
FIG. 4 is an isometric view of a preferred embodiment of a mobile shelter of FIGS. 1-3b as it is being deployed into the expanded configuration according to the present invention.

Once the shelter 100 is driven to a desired location, the compacted configuration 100a almost effortlessly transforms into the expanded configuration 100b and is usable as a self-sufficient facility. A winch or gear system 50 disposed in flatbed 10 and shown in the insert in FIG. 4 is coupled to movable wall 30 to configure shelter 100 into its two configurations. In a preferred embodiment, the transformation is employed by either a hand-powered, electric or hydraulically powered winch or gear system 50. The motive means whereby mechanical force is supplied to configure shelter 100 may be provided by many different mechanisms now known or later devised without departing from the scope of the invention. For example, a rack and pinion combination, or an hydraulic piston can be equivalently substituted for a winch or gear system. When actuated, winch 50 forces the drive wall 30 to travel on the longitudinal axis L toward the distal end 20b of the container 20. As the drive wall 30 moves on the longitudinal axis, the distal wall 40 remains fixed. The drive wall 30 forces the pivots 52, 54 to swing outward, thereby causing the sidewails 21, 22, 23, and 24 to swing or rotate outwardly and extend from the longitudinal axis L. In a preferred embodiment, the drive wall 30 travels far enough on the longitudinal axis L in order for the two proximal sidewalls 21, 22 and the two distal sidewalls 23, 24 to be approximately perpendicular to each other, although the angular orientation can be variably selected. When the shelter 100 is in the expanded configuration 100b, the sidewalls 21, 22, 23, and 24 form a diamond-like structure and define an interior space between them. Preferably, the drive wall 30 travels on a set of rails 36 shown in FIGS. 3a and 3b that are on the proximal end 20a of the container 20.

As seen in FIG. 4, the expanded configuration 100b further includes a roof structure 60 that extends vertically from the flatbed 10 and is rotatably coupled to and supported by the end walls 30 and 40. The roof structure 60 simultaneously raises as the sidewalls 21, 22, 23, and 24 are forced away from the longitudinal axis L by means of the movement of end wall 30 and is folded hinged in its midline along a direction perpendicular to axis L. In a preferred embodiment, the roof structure 60 includes sealed containers 65 that are concealed within the roof structure 60 when the shelter 100 is in the compacted configuration 100a. The sealed containers 65 are designed to open in order to allow waterproof canvases or flexible plastic roofing sections 70 to extend from the roof structure 60 to the sidewalls 21, 22, 23, and 24 below as shown as partially deployed in FIG. 6.

Roof structure 60 is shown as formed of two rigid half sheets which are hinged in a midline to form a roof similar to a hip roof, but it is also within the scope of the invention that it may be an accordion structure and more flattened. In such an embodiment roof structure 60 would simply compress or accordion fold to shorten. Alternatively, structure 60 could be built to telescope within each other to form a rigid flat surface.

Figure 5:
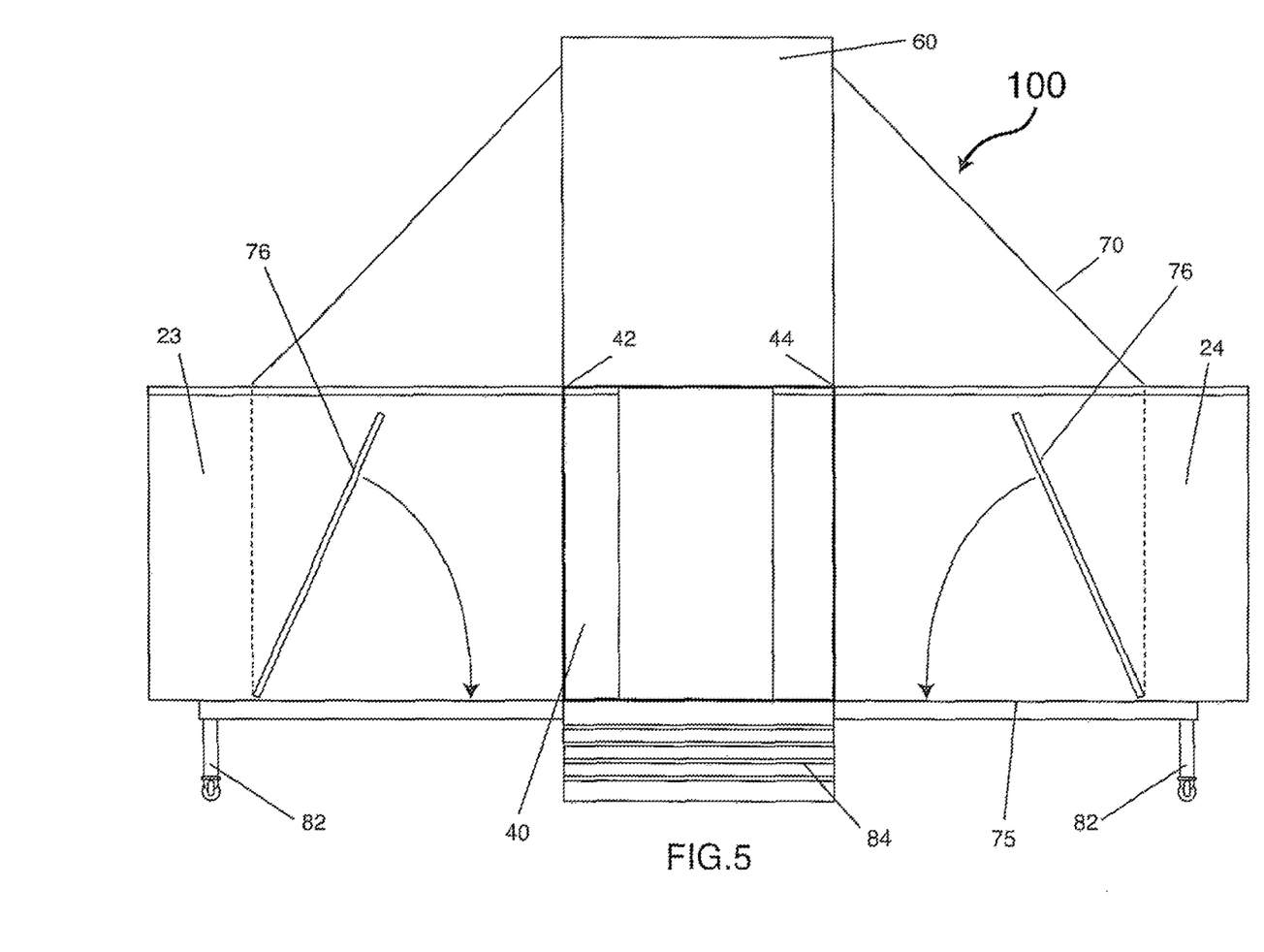
FIG. 5 is a rear plan view of a preferred embodiment of a mobile shelter of FIGS. 1-4 according to the present invention when fully expanded and showing lowering of the base or flooring structures.

FIG. 5 shows a rear view of the mobile shelter 100 while it's in the expanded configuration 100b. In a preferred embodiment, the mobile shelter 100 further comprises a base structure 75. The base structure 75 comprises hinged flooring panels 76 that are vertically stored within the container 20 while the structure is in the compacted configuration 100a. The flooring panels 76 are hingedly connected and adapted to fold inwardly and horizontally drop into place for providing complete flooring. In the extended configuration 100b, the sidewalls 21, 22, 23, and 24, the flooring panels 76 and the roof structure 60 together define an interior volume for holding a predetermined number of occupants in a defined space. In a preferred embodiment, the defined planar space is approximately eight (8) to ten (10) square meters, which is considered an optimum size for classrooms, operation roomsand the like.

In a preferred embodiment, the inner supports 26 provide alcoves 28 for storing miscellaneous accessories. The self-sufficiency of the mobile shelter 100 is provided by supplying a variety of amenities or services. The amenities can include, but are not limited to toilets and lavatories, nursing stations, dispensary, air handling, sleeping berths, exhibit cases, instrumentation packages, work stations, service counters, storage containers, intensive care units, and multimedia presentation equipment. An on-board electrical generator also be provided to provide portable power for a variety of uses. A water supply and a waterless waste storage also makes the shelter self-sufficient and its inhabitants sustainable for an extended period of time.

Shown best in FIG. 5, the sidewalls 21, 22, 23, and 24 are supported by extendable wheeled supports 82 that support the weight on either side of the interior volume of shelter 100. The shelter 100 also includes extendable stairs 84 that provide access into the interior volume of the expanded shelter 100b. Stairs 84 may be separately attachable as a rigid structure or may be provided as folded accordion stair steps attached to the rear edge of flatbed 10.

Figure 6:
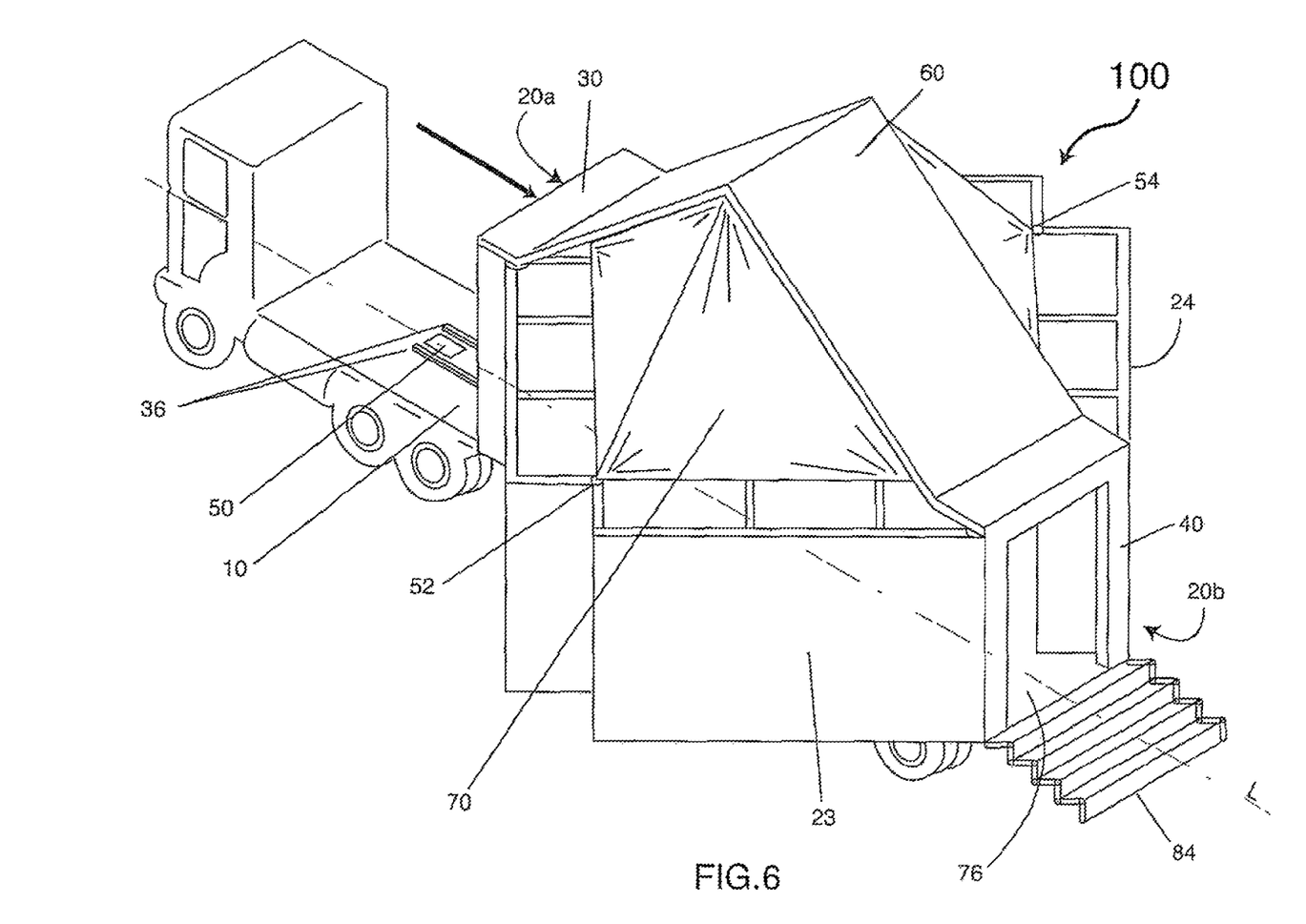
FIG. 6 is an isometric view of a preferred embodiment of a mobile shelter of FIGS. 1-5 showing partial deployment of a canvas roof structure according to the present invention.

Best shown in FIG. 6, the canvas or plastic roofing sections 70 enclose the shelter 100 when it's in the expanded configuration 100b, protecting the interior volume from the outside elements. The outer facing sidewalls 21b, 22b, 23b, and 24b are constructed to have smooth, unbroken surfaces in order to accept graphic art for advertising purposes, corporate logos, and may be provided with windows or other openings. Once expanded into the configuration of FIG. 6, the entire process described may be reversed and shelter 100 returned to its compact, transportable configuration shown in FIG. 1 with equal ease and speed to that required by its expansion.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

Many alterations and modifications may be made by those having ordinary skill in the art without departing from the spirit and scope of the invention. For example, the container 20 can be configured on any base once at the desired location and self sufficiently operated without the tractor-trailer. The mobile shelter 100 can be used for many functions, including lecture halls and party rooms, and it should be understood that it's use is not limited. Moreover, each of the rotatable or hinged connections of end wall 30 to roof structure 60, and sidewalls 21 22, of end wall 40 to roof structure 60, and sidewalls 23, 24, of sidewalls 21 and 23 to each other, of sidewalls 22 and 24 to each other and the midline hinge connection in roofing structure 60 are made so that the connections are weatherproofed. In the same way, flooring 76 includes weatherproofing seals installed in a manner well known to the art to provide a sealed floor as does sheeting 70 in the manner of its connection to the sidewalls 21, 22, 23, and 24.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A mobile shelter comprising:
    a transportable container having a first end and a second end, defining a longitudinal center axis there through, wherein the container further comprises;
    a base structure;
    a roof structure adjustably folded over the base structure;
    a load bearing frame comprised of four sidewalls, the sidewalls having an interior side and an exterior side, the sidewalls extending upwardly from the base structure; and
    a drive wall,
    wherein the shelter is transformed between a compacted configuration and an expanded configuration when the load bearing frame is rotated outward from the base structure, and
    wherein the compacted configuration transforms into the expanded configuration when the drive wall moves along the longitudinal axis, the drive wall forcing the sidewalls into an expanded configuration.

2. The mobile shelter of claim 1 wherein the compacted configuration is defined when the drive wall is at the furthermost point of the first end and the sidewalls are aligned with the longitudinal axis.

3. The mobile shelter of claim 1 wherein the expanded configuration is defined when the drive wall moves along the longitudinal axis towards the second end of the container, so as to force the sidewalls to fold outward from the axis.

4. The mobile shelter of claim 3 wherein a substantially closed interior volume is defined when the sidewalls are in the expanded configuration.

5. The mobile shelter of claim 1 wherein each sidewall further comprises alcoves on the inner side thereof.

6. The mobile shelter of claim 1 wherein the base structure comprises hinged flooring panels that are vertically supported within the container when the shelter is in the compacted configuration, the flooring panels being adapted to fold down and lay horizontally when the shelter is In the expanded configuration.

7. The mobile shelter of claim 1 wherein the load bearing frame supports the roof structure when the shelter is In the expanded configuration.

8. The mobile shelter of claim 1 further comprising retractable support means for supporting the frame when the structure is in the expanded configuration.

9. The mobile shelter of claim 1 wherein the roof structure comprises a pinnacle roof raised above the base structure, defining an apex line.

10. The mobile shelter of claim 9 wherein the roof structure further comprises sections of sheet material that extend from the roof structure to the sidewalls,
wherein the sections of sheet material complete the full enclosure of the shelter from outside elements.

11. The mobile shelter of claim 10 wherein the sections of sheet material are waterproof.

12. The mobile shelter of claim 1 wherein the sidewalls further comprise at least one interior corner, and wherein one sidewall is hinged to another adjacent sidewall at an interior corner thereof.

13. The mobile shelter of claim 12 further comprising a hinge means adapted to provide expandable folding movement of the sidewalls relative to each other.

14. The mobile shelter of claim 1 wherein the container is adapted to be transported on roadways.

15. The mobile shelter of claim 1 wherein the container is mounted onto a utility vehicle.

16. The mobile shelter of claim 15 wherein the utility vehicle is a tractor trailer.

17. The mobile shelter of claim 1 wherein the drive wall is manually operated.

18. The mobile shelter of claim 1 wherein the drive wall is electrically operated.

19. The mobile shelter of claim 2 wherein the structure conforms with highway transportation codes when in the compacted configuration.

20. A mobile shelter for mounting onto a flatbed of a trailer comprising;
a rail guided system; and
a container having a longitudinal axis defined there through, the container further comprising:
  a flooring structure;
  a roof structure adjustably fitted over the flooring structure;
  a load bearing frame comprised of four sidewalls, the sidewalls having an interior side and an exterior side;
  wherein the container is configurable between a compacted configuration and an expanded configuration; and
  a drive wall coupled to the load bearing frame for configuring the shelter between the compacted configuration and the expanded configuration, and
wherein the compacted configuration transforms into the expanded configuration when the drive wall moves along the longitudinal axis on the rail guided system, and wherein the drive wall forces the sidewalls into the expanded configuration.

21. A method of configuring a mobile shelter between a compacted configuration and an expanded configuration comprising:
moving a first end of a transportable container along a longitudinal axis of a base structure;
simultaneously raising a roof structure over the base structure; and
simultaneously swinging four load bearing sidewalls out from the base structure to configure the roof structure and sidewalls into the expanded configuration whereby the shelter is formed,
where moving the first end forces the sidewalls and roof structure into an expanded configuration.

22. The method of claim 21 where moving the first end, simultaneously raising a roof structure, and simultaneously swinging four load bearing sidewalls is reversed in direction to reconfigure the shelter from the expanded configuration to the compacted configuration by moving the first end in the reverse direction, simultaneously lowering the roof structure, and simultaneously swinging in the four load bearing sidewalls.

23. The method of claim 21 further comprising extending the roof structure to provide a covered shelter.

24. The method of claim 23 where extending the roof structure comprises completing the roof structure to cover the shelter by means of extending flexible sheeting attached to and stored in the roof structure.

25. The method of claim 21 further comprising rotating down flooring panels which are vertically stored within the container when the shelter is in the compacted configuration, the flooring panels being adapted to fold down and lay horizontally when the shelter is in the expanded configuration.

26. The method of claim 21 where moving the first end, simultaneously raising a roof structure, and simultaneously swinging four load bearing sidewalls comprising coupling the first end, roof structure and sidewalls together in a three dimensional polyhedron with selectively rotatably linked edges.

* * * * *